United States Patent [19]

O'Neal

[11] 4,198,036

[45] Apr. 15, 1980

[54] INFLATABLE PROTECTIVE CUSHION

[76] Inventor: Larry O'Neal, 4953 Timbercrest Dr., Canfield, Ohio 44406

[21] Appl. No.: 850,299

[22] Filed: Nov. 10, 1977

[51] Int. Cl.² ............................................. F16F 9/04
[52] U.S. Cl. ...................................... 267/140; 188/32
[58] Field of Search ................. 188/32; 267/139, 140; 280/11.37 B, 11.37 E, 11.37 J

[56] References Cited

U.S. PATENT DOCUMENTS 3,141,655  7/1964  Platt ........................................ 188/32

3,997,150  12/1976  Hanson et al. ..................... 188/32 X

FOREIGN PATENT DOCUMENTS 1181601  11/1964  Fed. Rep. of Germany .... 280/11.37 E
50400  3/1932  Norway ........................... 280/11.37 E Primary Examiner—Duane A. Reger
Attorney, Agent, or Firm—Webster B. Harpman

[57] ABSTRACT

An inflatable protective cushion for positioning around a pole or the like, such as on a ski lift which prevents skiers from striking the pole.

9 Claims, 3 Drawing Figures

INFLATABLE PROTECTIVE CUSHION

BACKGROUND OF THE INVENTION (1) Field of the Invention

This invention relates to inflatable protective structures that form a protective cushion around a pole.

(2) Description of the Prior Art

No prior structures of this type are known that employ an inflatable cushion that envelops a pole or like structure that provides protection from impact against the pole.

SUMMARY OF THE INVENTION

An inflatable protective cushion for enveloping attachment to poles or like structures such as ski lift supports, has a blower normally inflating the cushion and a quick venting valve communicates with the cushion so that upon impact some of the air pressure will be vented and reinflation can take place.

DESCRIPTION OF THE PREFERRED EMBODIMENT

Figure 1:
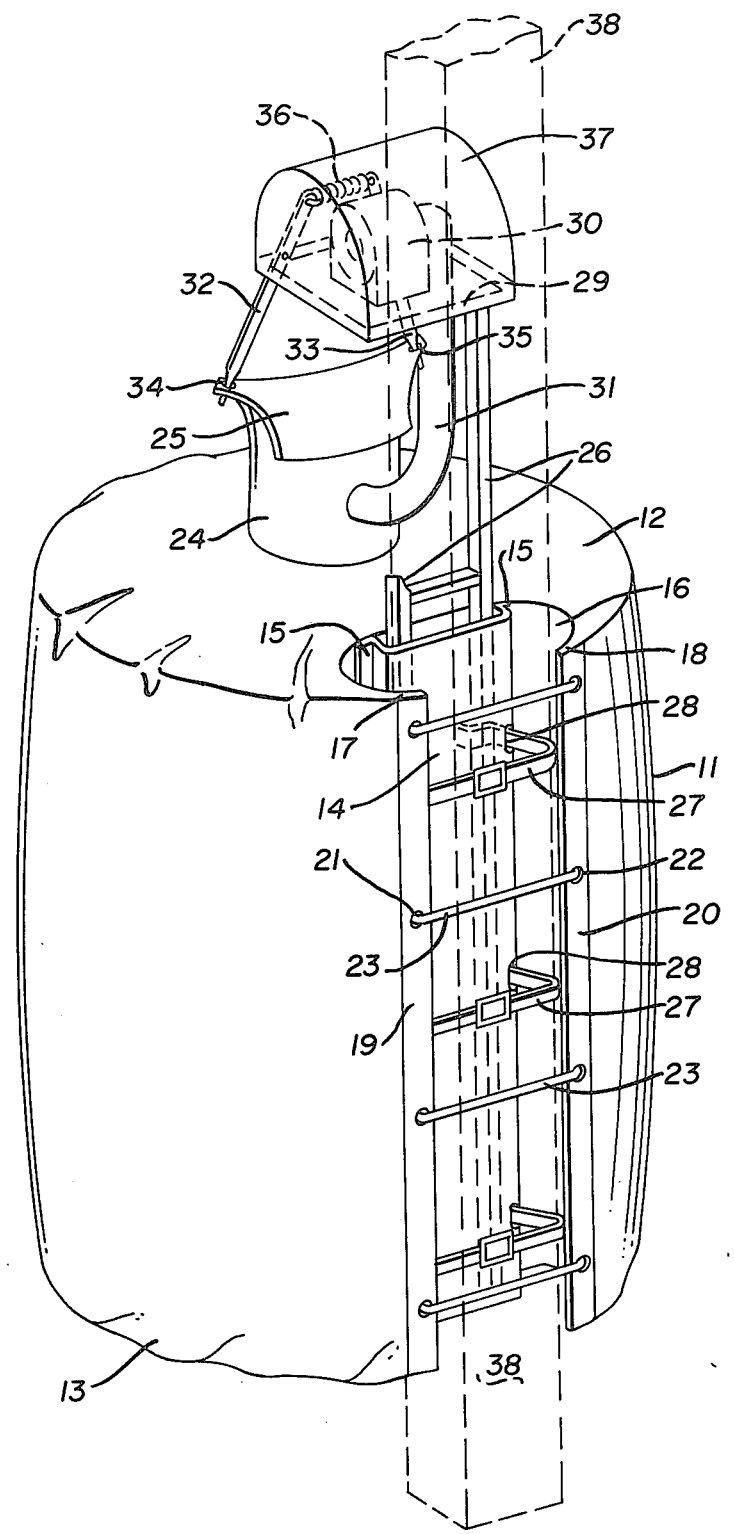
FIG. 1 is a perspective view of the inflatable cushion attached to a pole defined by broken lines.

An inflatable protective cushion comprises an inflatable member 11 which is generally cylindrical in shape with closed upper and lower ends 12 and 13. The inflatable member 11 is preferably formed of an air impervious flexible sheet material such as rubberized fabric or the like. The inflatable member 11 has an elongated open ended channel member 14 located along one side of the inflatable member 11 and extending between the upper and lower ends 12 and 13 thereof. The channel member 14 is formed of a section of flexible material, the longitudinal edges 14 thereof being secured to the wall forming the exterior of the inflatable member 11 as by sewing or heat sealing thereto. The inflatable member 11 is formed with an elongated recessed area 16 in the exterior thereof and the channel member 14 is located within the recessed area 16. The oppositely disposed edges 17 and 18 of the inflatable member 11 which define the recessed area 16 are reinforced as at 19 and 20 and are provided with a plurality of grommets 21 and 22 through which a lacing member such as a rope 23 may be passed.

A quick venting valve 24 is attached to the upper end 12 of the inflatable member 11 and communicates therewith. The quick venting valve 24 is tubular and folds down upon itself as at 25 to form a closure. An elongated ladder like frame 26 is positioned within the elongated channel member 14 with a portion of the frame 26 extending out of the open upper end of the channel member 14. Straps 27 are attached to the frame 26 through openings 28 in the channel member 14. A platform 29 is secured to the uppermost end of the frame 26. A blower 30 is mounted on the platform 29 and communicates with the inflatable member 11 through the quick venting valve 24.

A pair of oppositely disposed arms 32 are pivoted to the platform 29 and extend downwardly therefrom and engage oppositely disposed reinforced grommets 34 and 35 in the edges of the quick venting valve 24. A spring 36 attached to the uppermost end of the arms 32 normally urges the arms 32 towards one another. A hood 37 covers the blower 30, the blower is connected to a power source not shown.

In use the frame 26 is positioned in the channel member 14, the straps 27 are attached to the frame 26 through the openings 28 and then secured around a ski lift pole 38 or the like, the inflatable member 11 forming the protective cushion is then inflated by the blower 30, the ropes 23 are laced through the grommets 21 and 22 pulling the oppositely disposed edges 17 and 18 of the inflatable member 11 towards one another. When a moving body, such as a skier, strikes the protective cushion, the force of the impact will partially collapse the inflatable member 11 forcing some of the air out of the quick venting valve 24. After the initial impact, the spring urged arms 32 pull the quick venting valve 24 shut allowing for re-inflation by the blower 30. The protective cushion is then completely reinflated.

Figure 2:
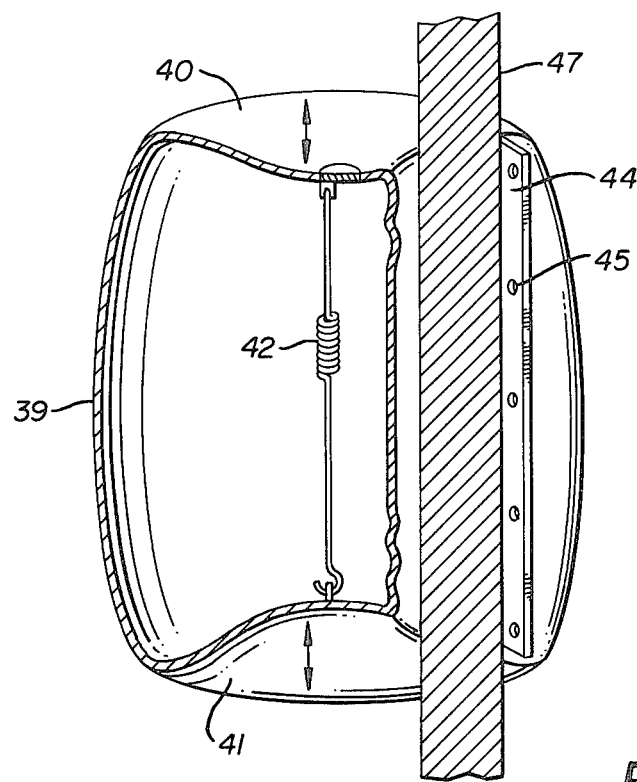
FIG. 2 is a cross sectional side elevation of a modification of the invention taken on line 2—2 of FIG. 3.
Figure 3:
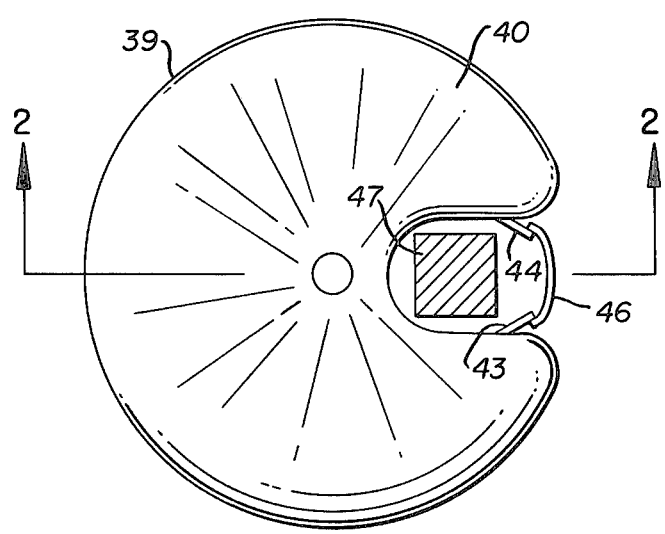
FIG. 3 is a top plan view of the modification shown in FIG. 2.

Modifications of the invention may be made and by referring to FIGS. 2 and 3 of the drawings, a modification is shown wherein an inflatable member 39 of flexible air impervious material is inflated and sealed. The inflatable member 39 has opposite walls 40 and 41 normally bowed inwardly towards one another by a resilient member 42 attached thereto. A pair of spaced, parallel flaps 43 and 44 are secured to the outer surface of the inflatable member 39, said flaps 43 and 44 having a plurality of grommets 45 positioned therein through which a lacing member, such as a rope 46, may be passed.

Once the inflatable member 39 is attached to a pole 47, it is inflated and sealed taking on a configuration partially surrounding the pole 47. Upon impact of a moving body, such as a skier, not shown, the opposite walls 40 and 41 will be pushed outwardly by the force of the displaced air within the inflatable member 39. After the impact the resilient member 42 urges the opposite walls 40 and 41 toward one another thus forcing the displaced air back into the main body of the inflatable member 39.

This form of the invention can be further modified by providing a normally sealed seam or vent opening arranged to rupture and the resilient member 42 can be eliminated.

Although but two embodiments of the present invention have been illustrated and described, it will be apparent to those skilled in the art that various changes and modifications may be made therein without departing from the spirit of the invention and having thus described my invention,

What I claim is:

1. An inflatable protective cushion for positioning around a ski lift support pole comprising a completely flexible hollow inflatable member having a single outer wall and upper and lower end portions, means for attaching the same to said support pole, said means including oppositely disposed portions of said inflatable member outer wall arranged to extend between said upper and lower portions for partial engagement about said support pole and fasteners holding said oppositely disposed portions in support pole engaging relation and means for inflating said inflatable member.

2. The inflatable protective cushion of claim 1 wherein a quick venting valve is in communication with the inflatable member.

3. The inflatable protective cushion of claim 1 and wherein the inflatable member is generally cylindrical in shape and has an elongated recessed area in one side thereof, said oppositely disposed portions defining said elongated recessed area.

4. The inflatable protective cushion of claim 1 wherein an elongated open ended channel member is positioned in said elongated recessed area and a ladder like frame is partially positioned in said open ended channel member and said means for inflating said inflatable member comprises a blower on said ladder like frame.

5. The inflatable protective cushion of claim 1 wherein an elongated open ended channel member is positioned in said elongated recessed area and a ladder like frame is partially positioned in said open ended channel member and said means for inflating said inflatable member comprises a blower on said ladder like frame, a quick venting valve in communication with said inflatable member, said quick venting valve comprising a tubular member normally flattened and folded upon itself, means for engaging the opposite sides of said tubular member in the area of said fold and urging said sides in opposite directions.

6. The inflatable protective cushion of claim 1 wherein the inflatable member is normally sealed and has a seam arranged to open upon impact of a body against the inflatable member.

7. The inflatable protective cushion of claim 5 wherein said means engaging the opposite sides of said tubular member comprise a pair of arms, means pivoting said arms to said ladder like frame and spring means engaging said arms.

8. The inflatable protective cushion of claim 5 wherein said open ended channel member is formed of a flexible material.

9. The inflatable protective cushion of claim 1 and wherein a resilient member is connected to said upper and lower end portions so as to hold the same in predetermined spaced relation and arranged to permit said upper and lower end portions to move away from one another when said inflatable protective cushion is forcefully engaged.

* * * * *